UNITED STATES PATENT OFFICE.

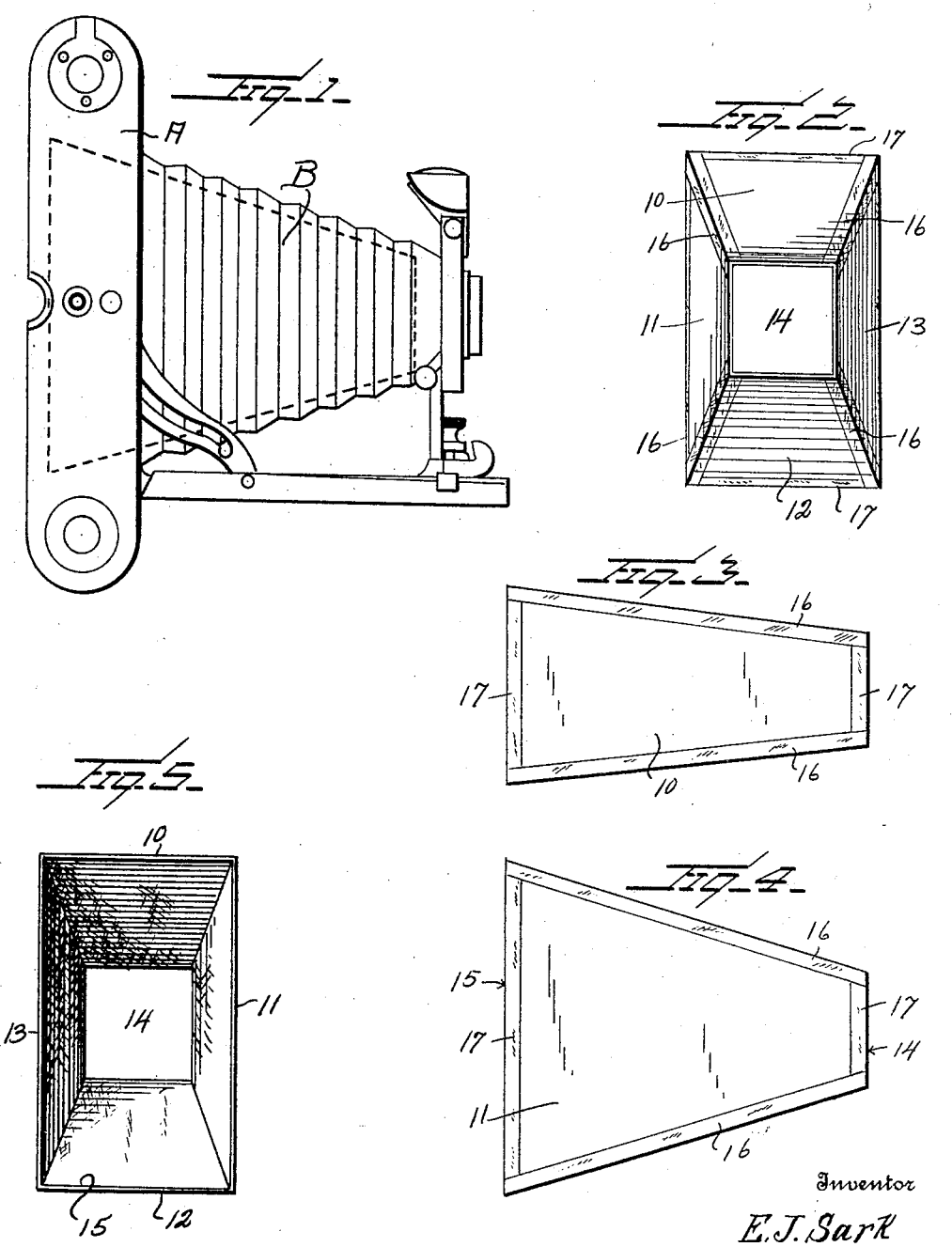

ELMER J. SARK, OF BARTLESVILLE, OKLAHOMA.

SHIELD OR PROTECTOR FOR PHOTOGRAPHIC CAMERAS.

1,397,661.   Specification of Letters Patent.   Patented Nov. 22, 1921.

Application filed January 22, 1921. Serial No. 439,219.

*To all whom it may concern:*

Be it known that I, ELMER J. SARK, a citizen of the United States, residing at Bartlesville, in the county of Washington and State of Oklahoma, have invented certain new and useful Improvements in Shields or Protectors for Photographic Cameras, of which the following is a specification, reference being had to the accompanying drawings.

This invention relates to bellows cameras, and particularly to a shield or protector to be used therewith designed, when inserted, to prevent the collapse of the bellows, thus making the entire camera more rigid, particularly when the camera is used for aerial photography.

A further object is to so construct the shield or protector that it may be readily inserted within cameras having removable backs and be as readily removed therefrom.

Other objects will appear in the course of the following description.

My invention is illustrated in the accompanying drawings, wherein:—

Figure 1 is a side elevation of a camera showing my attachment applied thereto in dotted lines;

Fig. 2 is an exterior end elevation of the shield or protector;

Fig. 3 is a top plan view;

Fig. 4 is a side elevation;

Fig. 5 is an elevation looking into the larger end of the shield or protector;

Referring to these drawings, it will be seen that the protector, which is made of flexible yet stiff material having a thickness and weight of approximately 8-ply Bristol board, is rectangular in cross section and is thus formed with four sides 10, 11, 12 and 13. The sections 10 and 12 are long relative to their width, as are the sections 11 and 13, but the sections 10 and 12 are relatively narrower than the sections 11 and 13. These four sections taper each from one end to the other, and when these four sections are placed together and joined, they constitute a tapering or pyramidal chamber open at its opposite ends so that the chamber is provided with a relatively small, square opening 14 at one end and a relatively large, square opening 15 at the opposite end. It will be understood, of course, that the interior of the shield will be blackened in any suitable manner so as not to reflect light. Preferably the sections 10, 11, 12 and 13 are joined at their corners by binding of lightweight cloth, designated 16. This binding constitutes in a way a hinge and permits flexibility in the sections so that it is relatively easy to insert the protector or shield within a camera or remove it therefrom.

Preferably also the end edges of the sections are bound by material 17. I do not wish to be limited to any particular size, though I have illustrated a protector or shield designed to be used in cameras having an exposure opening of $3\frac{1}{4}''$ by $5\frac{1}{2}''$.

In the practical use of this invention, the small end is inserted in the camera A through the back of the camera and into the expanded bellows B. When fully inserted, the small end of the protector is within the small end of the bellows, while the large end of the protector extends into the body A of the camera. The function of the device is to stiffen the bellows of the camera and hold it rigid and prevent its collapsing, bending or otherwise being deformed under the very great pressure of the air stream when aerial photographs are being taken from a balloon or from an aeroplane. When photographs are taken with an ordinary camera from an aeroplane and the bellows is expanded, the current of air sweeping past the bellows tends to deform it, or if the bellows be held with the current of air coming toward the bellows it is liable to collapse it. This device I have found entirely avoids this objection. It gives sufficient rigidity to the bellows as to prevent either collapsing or being deflected or deformed, while at the same time the device is sufficiently flexible to permit its ready insertion within the bellows.

It will be understood, of course, that the film or sensitized plate of the camera is disposed immediately behind the large end of the protector or shield. Reflections are prevented by blackening the interior of the shield.

I do not wish to be limited to the particular material used for the shield or protector or for the details of construction, as both the material and the details of construction may be modified in many ways without departing from the spirit of the invention.

It will be understood that the shield or protector does not in any way interfere with the camera in focusing. The protector when disposed within the camera is supported at the small or front end by the folds of the bellows which is securely fastened to the lens plate or frame. The large end of the rear end of the protector is supported by the framework of the camera. The protector should be inserted sufficiently to support the protector which will permit free action of the film passing back of the protector, which films, of course, will be put in place after the protector is in place. The protector acts as an assistant support to the regular support for the lens plate or frame of the camera, which lens plate or frame is too frail to withstand the severe strain of an extreme wind pressure to which the camera is exposed in an aeroplane or balloon. Without the use of this protector, the lens or frame has a tendency to be forced toward the camera at the top, thus throwing the center line of exposure off from the center of the plate of film, due to the deformation of the bellows under wind pressure. This protector offers protection against partial exposure of the films or plates by reason of the collapsed or deformed condition of the bellows and prevents damage to the bellows of the camera by reason of severe wind pressure.

While the device is particularly designed to be used for aerial photography, it will be understood that it may be used to advantage in cameras for any purpose, and by its use the ordinary camera may be used without danger for aerial photography.

I claim:—

1. In a camera having an expanding bellows, means disposed within the bellows for preventing the deflection or collapse of the bellows, said means being rigid against longitudinal pressure.

2. As an article of manufacture, a protector for cameras comprising a relatively tapering hollow body open at its opposite ends and rectangular in cross section, the body being made of relatively thin material, rigid against longitudinal pressure and adapted to be inserted within a camera bellows.

3. As an article of manufacture, a protector for camera bellows comprising a hollow body open at its opposite ends, tapering from one end to the other, and square in cross section, each side of the body being formed of a separate section of relatively thin material, the sides being flexibly connected to each other at their joints.

4. As an article of manufacture, a protector for camera bellows comprising a hollow body open at its opposite ends, tapering from one end to the other, and square in cross section, each side of the body being formed of a separate section of relatively thin material, and binding connecting the edges of the sections to each other at the joints of the body and covering said joints.

In testimony whereof I hereunto affix my signature.

ELMER J. SARK.